March 31, 1931.    B. I. HILL    1,798,203
DEVICE FOR MEASURING THE OPACITY OF FILMS
Filed Nov. 7, 1928    2 Sheets-Sheet 1
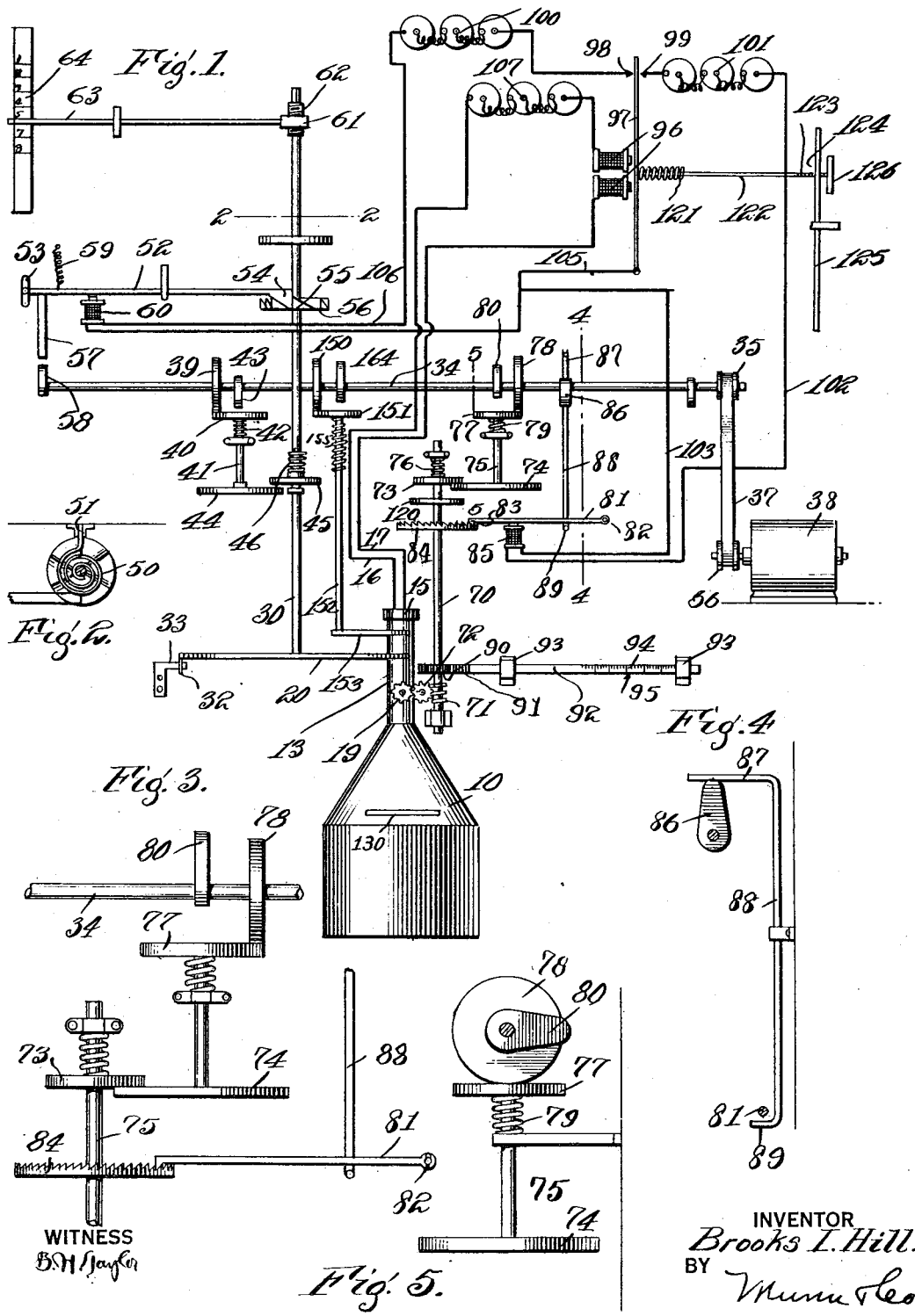
WITNESS
INVENTOR
Brooks I. Hill.
BY
ATTORNEY March 31, 1931. B. I. HILL 1,798,203
DEVICE FOR MEASURING THE OPACITY OF FILMS
Filed Nov. 7, 1928 2 Sheets-Sheet 2
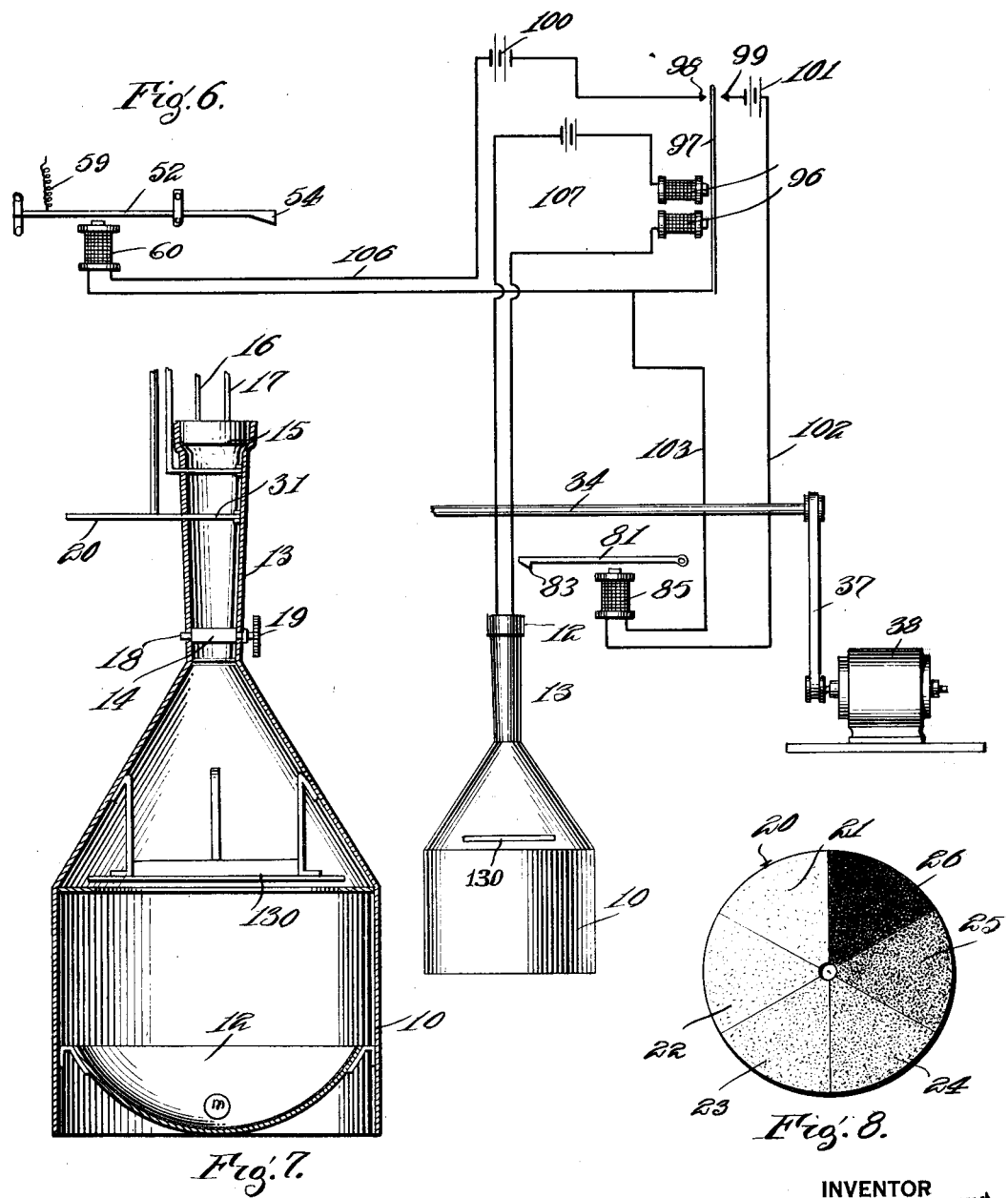
INVENTOR
Brooks I. Hill
BY
Munn & Co.
ATTORNEY Patented Mar. 31, 1931

1,798,203

UNITED STATES PATENT OFFICE

BROOKS I. HILL, OF NEOSHO, MISSOURI

DEVICE FOR MEASURING THE OPACITY OF FILMS

Application filed November 7, 1928. Serial No. 317,868.

This invention relates to a device for measuring the light permeability of translucent materials, such as films.

An object of the invention is the provision of a device for measuring the light permeability of translucent materials, such as films and for standardizing the degree of exposure and the grade of photographic paper that is best adapted to be exposed through the film.

A further object of the invention is the provision of a device for measuring the light permeability of translucent or transparent materials or for measuring the opacity of translucent sheets by passing light rays through a section of a translucent screen, the sections of the screens having varying degrees of opacity to balance the degree of opacity of a film which is adapted to be tested.

A still further object of the invention is the provision of a device for measuring the opacity of films and for giving a visual indication of the time required to print a particular paper which has been selected by a second indicator through the influence of a cell of changeable resistance under the influence of light rays of definite intensity.

This invention will be best understood from a consideration of the following detailed description in connection with the accompanying drawings; nevertheless, it is to be understood that the invention is not confined to the disclosure being susceptible of such changes and modifications as shall define no material departure from the salient features of the invention as expressed in the appended claims.

In the drawings:—

Figure 1 shows more or less diagrammatically an alarm constructed in accordance with the principles of my invention, Figure 2 is a horizontal section taken along the line 2—2 of Fig. 1, Figure 3 is an enlarged detail of the stopping mechanism for controlling the timing indicator, Figure 4 is a vertical section taken along the line 4—4 of Fig. 1, Figure 5 is a vertical section taken along the line 5—5 of Fig. 1, Figure 6 shows more or less diagrammatically the electric circuits of the alarm, Figure 7 is a vertical section of the lamp housing, Figure 8 is a plan view of a translucent screen.

Referring more particularly to the drawings, 10 indicates a lamp housing having a source of light 11 and a reflector 12 for projecting light rays upwardly through the housing and through a reduced portion 13. A diaphragm 14 is mounted in the restricted tubular member 13 and disposed across the light rays from the source of light 11 to control the quantity of light which is projected upon the photo-electric cell 15. A selenium cell or any type of cell of changeable resistance under the influence of light rays may be employed for the purpose. Wires 16 and 17 are connected with the cell and form a part of the circuit in a manner which will be presently explained. The diaphragm 14 is operated by means of a shaft 18 which in turn is revolved by a gear 19. A translucent screen 20, shown more particularly in Figure 8, is divided into a plurality of sectors, indicated by the numerals 21 to 26, inclusive. The sector 26 has the greatest degree of opacity while sector 21 has the least. The intermediate sectors are progressively increased in opacity from the sector 21 to 26, inclusive, for controlling various quantities of light rays which will affect the cell 15.

The screen 20 is revolved by means of a shaft 30 and has a portion, as shown at 31 in Figure 7, moving through a slot in the tubular member 13 and across the light rays from the lamp 11. The screen is provided with a lug 32 adapted to engage a stop 33 secured in a fixed position for limiting the rotary movement of the screen.

The shaft 34 is driven by means of pulleys 35, 36, a belt 37 and a motor 38. A friction disc 39 is rigid with the shaft 34 and is in frictional contact with a disc 40 secured to a shaft 41. A spring 42 tends to maintain the disc 40 in engagement with the disc 39. A cam 43, secured to the shaft 34, is adapted to periodically engage the disc 40 and force it out of contact with the disc 39 against the tension of the spring 42. A friction disc 44 secured to the shaft 41 is adapted to engage a friction disc 45 rigid with the shaft 30 when the spring 42 forces the disc 40 in contact with the disc 39.

A spring 46 maintains the disc 45 in frictional contact with the disc 44 so that when the disc 44 is revolved the disc 45 and likewise the shaft 30, together with the screen 20, are revolved in synchronism.

A spring 50 is secured at one end to a fixed support 51 and at its other end to the shaft 30 so that when the shaft is revolved in one direction the spring will tend to rotate the shaft in the opposite direction. When the shaft 30 is free to be rotated the spring 50 will cause reverse rotation of said shaft.

A lever 52 is pivotally mounted, at 53, and is provided with a pawl 54 adapted to engage spaced teeth 55 on a disc 56 which is secured to the shaft 30. An arm 57 rigid with one end of the lever 52 projects downwardly in the path of the cam 58 which is secured to the shaft 34. A spring 59 is secured at one end to a fixed support and through lever 52 tends to maintain the arm 57 out of engagement with the cam 58.

A magnet 60 is located adjacent the lever 52, which in this case acts as an armature, and is moved downwardly by means of the magnet so that the pawl 54 will engage the teeth 55 of the disc 56.

A nut 61 is threaded onto a screw 62 which is rigid with the shaft 30 so that when the shaft is revolved and the nut 61 is maintained against rotation, said nut will be moved upwardly or downwardly, depending upon the direction of rotation of the shaft 30. A pointer 63 is secured to the nut 61 and is movable over a scale 64 for a purpose which will be presently explained.

A shaft 70 is mounted in bearings (not shown) and is provided with a worm 71 to mesh with a worm gear 72 which in turn meshes with the gear 19. The shaft 70 is driven by means of a friction disc 73 in contact with a disc 74 secured to a shaft 75. A spring 76 forces the disc 73 in contact with the disc 74. The shaft 75 is driven by means of a disc 77 in frictional contact with a disc 78 which is rigid with the shaft 34. A spring 79 maintains the shaft 75 and the disc 77 in an uppermost position for maintaining contact between the disc 77 and the disc 78. A cam 80, secured to the shaft 34, is adapted to periodically engage the disc 77 and move it out of engagement with the disc 78 for stopping rotation of the shaft 75.

An arm 81, pivotally mounted at 82, has a pawl 83 adapted to engage one of the teeth of the toothed wheel 84 for rotation of the shaft 70. This arm is in effect an armature and adapted to be moved into engagement with the toothed wheel 84 when a magnet 85 is energized. A cam 86, secured to the shaft 34, is adapted to engage a lug 87 at the upper end of a slidably mounted rod 88 for raising the rod whereby a lug 89 will engage the arm 81 and raise it out of contact with the toothed disk 84.

A gear 90 is rigid with the shaft 70 and meshes with a rack 91 formed on a rod 92 slidably mounted in bearings 93. One end of the rod 92 is provided with a scale 94, which is adapted to be moved in close association with a pointer 95.

An electric circuit, including wires 16 and 17, also includes the photo-electric cell 15 and a relay 96 which controls a two-way switch 97 movable between a pair of contacts 98 and 99 closing a circuit to either the battery 100 or the battery 101.

A wire 102 connects one terminal of the battery 101 with the magnet 85. A wire 103 extends from the magnet to a wire 104 which is connected with the switch 97. A wire 105 is also connected with the magnet 60 while a wire 106 connects the other terminal of the magnet with one pole of a battery 100. The other pole of said battery is connected with the relay 96 at point 98. The wire 17 is connected between the cell 15 and the relay 96. The wire 16 is connected to battery 107 thence to relay 96.

A coil spring 120 has one end secured to the shaft 70 and the other end to a fixed point and this coil spring acts in the same manner as the coil spring 50 in Figure 2. The spring tends to unwind and therefore reverse the shaft 70, thereby causing the diaphragm 14 to be opened. A spring 121 is connected to the member 97 and also to a rod 122. The rod 122 is threaded, as at 123, upon which a nut 124 is threaded carried by a lever 125. The outer end of the rod is provided with a knurled finger-piece 126 for manually rotating the rod 122 for placing a greater or less tension on the spring 121.

The operation of my device is as follows: The negative is placed in a holder 130 so that the light from the lamp 11 passes through the negative, through the diaphragm 14 and is projected upon the cell 15. The light at this time also passes through the section 26 of the screen 20 since this section is its starting position and is normally maintained in position within the tube 13. The motor 38 is set in operation whereby the shaft 34 is revolved. When the cam 43 is moved from engagement with the disc 40, said disc will frictionally contact with the disc 39, after the spring 42 has moved the disc 40 and the shaft 41 upwardly. At this time the disc 44 engages the disc 45, thereby causing rotation of shaft 30 and the screen 20.

The rotation of shaft 34 causes the cam 80 to be moved out of engagement with the disc 77 whereby the spring 79 will move said disc into engagement with the friction disc 78.

At this time the shaft 75 is rotated, and through the friction discs 73 and 74 the shaft 70 will be revolved. Rotation of shaft 70 will cause rotation of gears 19 and 72 and closing of the diaphragm 14 against the action of the spring 120. It will be appreciated, however, that current will pass through the wires 16 and 17 from the battery, until the diaphragm has closed sufficiently to restrict the quantity of light rays passing through the diaphragm and also through the section of the screen 20. It will thus be seen that the opacity of the film and of the section of the screen cooperate with each other and with the degree of opening of the diaphragm to properly affect the cell 15 in order to permit the current from the battery to pass or cease to pass through said cell.

A friction disc 150 is rigid with the shaft 34 and is adapted to normally engage a friction disc 151 rigid with a shaft 152. The lower end of said shaft carries a screen of translucent material, indicated at 153, which is adapted to be moved through a slot in the tubular member 13 and across the light rays from the lamp 11 for cutting down the quantity of light passing to the selenium cell when papers are being selected by the device. A cam 164 is adapted to engage the disc 151 and periodically moves said disc out of engagement with the disc 150. A spring 155 tends to maintain the disc 151 in engagement with the disc 150 and the disc 151 is slidably carried on the shaft 152.

The diaphragm 14 tends to close when the shaft 70 is rotated. However, when the current passing through the circuit which includes the wires 16 and 17 fall sufficiently, the two-way relay 96 releases the arm 97 permitting said arm to close the circuit when it engages the contact 99. Closing of the circuit energizes the magnet 85 which causes the arm 81 to be moved downwardly whereby the stop 83 will engage the teeth of the wheel 84, and prevent further closure of the diaphragm. At the same time the indicator 92 is moved towards the left and when the shaft 70 is stopped, the arrow 95 will point to a notation on the rods 92 for defining the number of seconds required to print through the negative placed within the housing 10, on the paper selected.

It must not be misunderstood that the paper selected must be completed before the timing device or diaphragm begins its operation.

The teeth on wheel 55 should correspond in number to the number of sections of screen 20 and the teeth must be arranged in such a manner that a section of the screen will always stop in the tube 13. It must be remembered that the section in the screen that is stopped within the tube 13 will be the direct cause of arm 63 indicating the grade of paper to be used.

One of the important functions of the device is the selection of a grade of paper to be employed. There are several grades of photographic paper and these grades are so made that they will produce the best effect or picture from negatives of varying contrasts. After the paper is selected the exposure for the proper printing of the paper is determined, as has been previously explained.

In other words, the device provides a means which will indicate the grade of paper that will be adapted to the wide range of negative contrast and will also determine the length of exposure required to make a good print on the paper selected.

I claim:

1. A device for measuring the opacity of translucent sheets comprising a cell of changeable resistance under the influence of light rays, a luminous body, a translucent screen having sections of varying degrees of opacity, means for supporting a translucent sheet to be tested across the light rays and between the luminous body and the translucent screen, means for moving the sections across the light rays, a source of electric current in circuit with said cell, means for stopping the moving means for the sections, means included in the circuit for setting in operation the stopping means and adapted to be actuated in accordance with the intensity of the light affecting the cell, the intensity of the light rays affecting the cell being controlled by the combined opacities of a particular section of the screen and the translucent sheet.

2. A device for measuring the opacity of translucent sheets comprising a cell of changeable resistance under the influence of light rays, a luminous body, a translucent screen having sections of varying degrees of opacity, means for supporting a translucent sheet to be tested across the light rays and between the luminous body and the translucent screen, means for moving the sections across the light rays, periodically-actuated means for stopping the moving means for the sections, a source of electric current in circuit with said cell, means for stopping the moving means for the sections, means included in the circuit for setting in operation the stopping means and adapted to be actuated in accordance with the intensity of the light affecting the cell, the intensity of the light rays affecting the cell being controlled by the combined opacities of a particular section of the screen and the translucent sheet.

3. A device for measuring the opacity of translucent sheets comprising a cell of changeable resistance under the influence of light rays, a luminous body, a translucent screen having sections of varying degrees of opacity, means for supporting a translucent sheet to be tested across the light rays and between the luminous body and the translucent screen, means for moving the sections across the light rays a source of electric current in circuit with said cell, means for stopping the moving means for the sections, means included in the circuit for setting in operation the stopping means and adapted to be actuated in accordance with the intensity of the light affecting the cell, and means for releasing the stopping means, the intensity of the light rays affecting the cell being controlled by the combined opacities of a particular section of the screen and the translucent sheet.

4. A device for measuring the opacity of translucent sheets comprising a cell of changeable resistance under the influence of light rays, a luminous body, a translucent screen having sections of varying degrees of opacity, means for supporting a translucent sheet to be tested across the light rays and between the luminous body and the translucent screen, means for moving the sections across the light rays, means for periodically stopping the moving means for the sections, a source of electric current in circuit with said cell, means for stopping the moving means for the sections, means included in the circuit for setting in operation the stopping means and adapted to be actuated in accordance with the intensity of the light affecting the cell, means for releasing the stopping means, and means for returning the sections of the screen to a normal inoperative position, the intensity of the light rays affecting the cell being controlled by the combined opacities of a particular section of the screen and the translucent sheet.

5. A device for measuring the opacity of translucent sheets comprising a cell of changeable resistance under the influence of light rays, a luminous body, a translucent screen having sections of varying degrees of opacity, means for supporting a translucent sheet to be tested across the light rays and between the luminous body and the translucent screen, means for moving the sections across the light rays, a source of electric current in circuit with said cell, means for stopping the moving means for the sections, means included in the circuit for setting in operation the stopping means and adapted to be actuated in accordance with the intensity of the light affecting the cell, a diaphragm for controlling the quantity of light projecting through a section of the screen, means for moving the diaphragm to closing position, and means for stopping the actuating means for the diaphragm when the quantity of light has been reduced to a predetermined degree.

6. A device for measuring the opacity of translucent sheets comprising a cell of changeable resistance under the influence of light rays, a luminous body, a translucent screen having sections of varying degrees of opacity, means for supporting a translucent sheet to be tested across the light rays and between the luminous body and the translucent screen, means for moving the sections across the light rays, a source of electric current in circuit with said cell, means for stopping the moving means for the sections, means included in the circuit for setting in operation the stopping means and adapted to be actuated in accordance with the intensity of the light affecting the cell, a diaphragm for controlling the quantity of light projecting through a section of the screen, means for moving the diaphragm to closing position, means for stopping the actuating means for the diaphragm when the quantity of light has been reduced to a predetermined degree, and means controlled by the closing means for the diaphragm for indicating the time of exposure for printing a paper through the translucent sheet.

7. A device for measuring the opacity of translucent sheets comprising a cell of changeable resistance under the influence of light rays, a luminous body, a translucent screen having sections of varying degrees of opacity, means for supporting a translucent sheet to be tested across the light rays and between the luminous body and the translucent screen, means for moving the sections across the light rays, a source of electric current in circuit with said cell, means for stopping the moving means for the sections, means included in the circuit for setting in operation the stopping means and adapted to be actuated in accordance with the intensity of the light affecting the cell, means controlled by the moving means for the sections for indicating the type of printing paper to be employed, and means controlled by the intensity of the light affecting the cell for indicating the time of exposure for printing the paper through the translucent sheet.

8. A device for measuring the opacity of translucent sheets comprising a cell of changeable resistance under the influence of light rays, a luminous body, a translucent screen having sections of varying degrees of opacity, means for supporting a translucent sheet to be tested across the light rays and between the luminous body and the translucent screen, means for moving the sections across the light rays, a source of electric current in circuit with said cell, means for stopping the moving means for the sections, means included in the circuit for setting in operation the stopping means and adapted to be actuated in accordance with the intensity of the light affecting the cell, a diaphragm for controlling the light rays to the cell, a second source of current in circuit with the cell, means for controlling the circuit, and means controlled by the second circuit for controlling the operation of the diaphragm.

BROOKS I. HILL.